(12) United States Patent
Falco et al.

(10) Patent No.: US 6,687,752 B1
(45) Date of Patent: Feb. 3, 2004

(54) DYNAMIC RTP/RTCP TIMESTAMP VALIDATION

(75) Inventors: Michael A. Falco, Swampscott, MA (US); Brittain S. McKinley, Groton, MA (US)

(73) Assignee: Ezenial Inc., Burlington, MA (US)

( * ) Notice: Subject to any disclaimer, the term of this patent is extended or adjusted under 35 U.S.C. 154(b) by 0 days.

(21) Appl. No.: 09/516,071

(22) Filed: Mar. 1, 2000

(51) Int. Cl.$^7$ .................................................. G06F 15/16
(52) U.S. Cl. ........................................ 709/230; 709/238
(58) Field of Search .................................. 370/259, 260, 370/261, 262, 263, 270, 471; 709/204, 230, 231, 232, 233, 238

(56) References Cited

U.S. PATENT DOCUMENTS

| | | | | |
|---|---|---|---|---|
| 5,450,394 A | * | 9/1995 | Gruber et al. | 370/253 |
| 6,263,371 B1 | * | 7/2001 | Geagan et al. | 709/231 |
| 6,327,274 B1 | * | 12/2001 | Ravikanth | 370/516 |
| 6,452,950 B1 | * | 9/2002 | Ohlsson et al. | 370/516 |

OTHER PUBLICATIONS

LeBlanc, U.S. patent application Publication US 2002/0075857, Jun. 20, 2002.*

* cited by examiner

*Primary Examiner*—Zarni Maung
*Assistant Examiner*—Gregory Clinton
(74) *Attorney, Agent, or Firm*—Cesari and McKenna, LLP

(57) ABSTRACT

Network nodes (12, 14, 16, 18, and 20) that exchange time-dependent data in accordance with the Real-Time Transport Protocol subject the timestamps of incoming packets (FIG. 1) to tests that indicate whether the timestamps were likely generated correctly. Such a no de begins an RTP session by determining its output in accordance with the incoming packets' times of arrival. It thereafter bases its output's timing on the incoming packets' timestamps if previously received packets have passed a test (FIG. 5) that indicate their timestamps' reliability. While such a node operates in such a timestamp-based output-timing mode, it continues to test incoming timestamps and assumes operation according to the time-of-arrival mode if too many packets fail the timestamp-reliability test.

24 Claims, 4 Drawing Sheets

DYNAMIC RTP/RTCP TIMESTAMP VALIDATION

BACKGROUND OF THE INVENTION

1. Field of the Invention

The present invention is directed to processing information received in Real Time Protocol ("RTP") packets.

2. Background Information

In packet networks, one cannot predict a packet's time of arrival from its time of transmission. One packet may reach its destination well before a packet that was transmitted previously from the same source. This is a difference between packet-switched and circuit-switched networks. In circuit-switched networks, a channel is dedicated to a given session throughout the session's life, and the time of arrival tracks the time of transmission.

Since the order in which data packets are transmitted is often important, various packet-network transport mechanisms provide the packets with sequence numbers. These numbers give the packets' order. They do not otherwise specify their relative timing, though, since most transmitted data have no time component. But voice and video data do, so protocols have been developed for specifying timing more completely. A protocol intended particularly for this purpose is the Real-Time Transport Protocol ("RTP"), which is set forth in the Internet Community's Request Comments ("RFC") 1889.

For the sake of example, FIG. 1 shows the format of an Ethernet frame that carries an RTP packet, although not all such packets are sent over Ethernet links. FIG. 1 shows the Ethernet frame's header and trailer fields, which are separated by the Ethernet frame's payload. The Ethernet header not only identifies the frame's (same link) recipient node but also includes a de-multiplying field, which specifies the destination-node process that is to use the Ethernet frame's payload.

Again for the sake of example, we assume that the Ethernet header's de-multiplexing field has specified that the Ethernet frame's payload is an Internet Protocol ("IP") packet, as the IP header's presence in FIG. 1 indicates. The IP process's purpose is to determine where to forward the IP packet's payload; ordinarily, the recipient node is simply to forward that payload and not otherwise use it. It is only the ultimate-destination node that uses the IP packet's payload. The IP header includes a de-multiplexing field, which enables the destination node to decide which of its processes is to use the payload. We assume for present purposes that the de-multiplexing field specifies the User Datagram Protocol ("UDP") process.

That process is a transport process: it selects a further process, specified by the UDP header's own de-multiplexing field, to which the UDP packet's payload is to be delivered. The contents of the UDP header's de-multiplexing field are known as a "port" number, and the situation of particular interest here is the one in which that port number has been assigned to an RTP session.

When it has, the receiving process interprets the first part of the UDP payload as an RTP header, whose format FIG. 2 depicts. The RTP-header field of particular interest here is the timestamp field. The data being transmitted can usually be thought of as samples of a function. Each video frame is a sample from a moving scene, for instance, and audio data typically result from sampling sound pressure. Timestamps represent the relative times at which the transmitted samples were taken.

At its page 11, RFC 1889 discusses specific approaches to generating RTP timestamps. One way is for the transmitting node initially to select a random number and note the offset between that number and the current local "wall-clock" time. It thereafter uses this offset to calculate from wall-clock time the values of the timestamps it places in respective RTP packets' headers.

As was explained above, the node participating in an RTP session will have allocated a port number to that session, and it will interpret UDP payloads delivered to that port as having the just described RTP format. But it needs further, control information to support the session, and it additionally allocates an adjacent-numbered port to the session for that purpose. UDP payloads delivered to this port will be interpreted as RTCP packets, whose formats RFC 1889 also describes. Of the several RTCP message formats, FIG. 3 depicts the sender-report format, which is of particular interest to the present discussion. The contents of that packet's PT field identify it as having that format, which contains two types of timestamp fields.

The RTP timestamp field is the same as the timestamp field included in FIG. 2's RTP format; it is calculated from wall-clock time with the offset used for the same session's RTP packets. Its value represents the time at which the RTCP packet was sent. The other, NTP timestamp field is larger and contains the sender's wall-clock time from which the RTP-timestamp value was computed. The other session participant may use these values to make judgments concerning packet delay, jitter, and so forth.

The various nodes that receive RTP packets can use their timestamps to time outputs that they generate from the data that the RTP packets contain. Various recipients' outputs can have different forms, and the ways in which they base those outputs on incoming timestamps vary, too.

Consider the teleconference arrangement that FIG. 4 depicts, for example. A multipoint-conference unit 12 conducts RTP sessions with various nodes 14, 16, 18, and 20. Multipoint-conference unit 12 receives input in RTP packets from one or more of the participant units 16, 18, 20, and 22. From the data thereby received it generates data that it sends in RTP packets to the various participant units. For example, it may receive audio and video from several of the units, identify the unit that is generating the loudest audio, and forward that unit's video output to all of the other units while it sends them a mixture of all units' audio in respective parallel sessions. By employing the timestamps, each unit can determine the relative timing at which to apply the data to the screens and speakers: it can base actual output-signal production on the timestamps it receives.

The same is true of gateway 14. It receives video and audio data in RTP sessions with the multipoint conference unit 12 and forwards the data over an ISDN line to a further conference terminal 24. Since it is using an ISDN line, gateway 14's output-data timing must be implicit from the time at which node 24 receives the data so gateway 14 bases the timing of its transmissions on the input timestamps.

The situation is different in the case of the multipoint conference unit 12. It neither presents the data in screens and speakers, as nodes 16, 18, 20, and 24 do, nor sends it by way of an implicitly-timed channel. Instead its output takes the form of packets sent in the various RTP sessions. These packets' times of transmission are not necessarily determined by the timestamps on the packets in which unit 12 received the data from which it generated its output. So unit 12's output timing takes the form of the outgoing packets' timestamp values, and it is these values that the multipoint conference unit 12 bases on the timestamps that it receives.

RTP thus provides a versatile way of sending time-based data and can serve as foundation for using packet-switched networks for information of that type. But it has turned out that a lot of equipment that ostensibly uses RTP does not employ timestamp values effectively. In many cases this is because the equipment applies and/or uses the timestamps incorrectly. In other cases the equipment uses timestamps as intended but still performs poorly because it communicates with other equipment that does not. This has made RTP use less attractive than it should be.

SUMMARY OF THE INVENTION

But I have recognized that performance can be improved as a practical matter by basing output timing on input timestamp's only selectively, in accordance with tests that are made by comparing various packets' timestamps.

There are a number of tests that can be employed for this purpose. One is based on observing the progressions of the RTCP packets' RTP and NTP timestamps. If the amounts by which the RTP timestamps advance from one RTCP packet to the next differs excessively from the amount by which the same packets' NTP timestamps do, then the timestamps are likely unreliable, and the output timing should be based on the incoming packets' time of arrival rather than the timestamps that they carry. Other indications that timing should occur on a time-of-arrival basis rather than on a timestamp basis may include the fact that the estimated transmission delay is too great or varies excessively. Yet another may be that the timestamp in an RTCP message represents a time before those that too many previously received timestamps represent.

These criteria may be employed in a number of ways. For example, the time-of-arrival approach may be employed when a session begins, and the node may then convert to the timestamp approach after particular ones of these criteria have been met. As another example, the node may monitor its incoming traffic during the use of the timestamp approach to determine whether it meets those and/or other criteria. If it does not, or if it fails to meet those criteria too frequently, then the node can revert to the time-of-arrival approach.

By using criteria such as those described above, a receiving node can benefit from RTP timestamps but avoid much of the adverse performance impact in which improper timestamp application can result.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
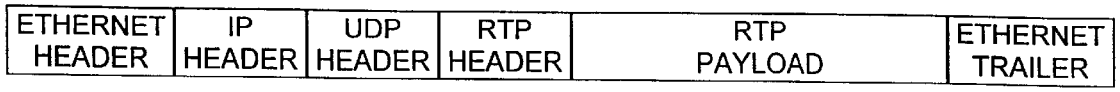
FIG. 1, previously discussed, is a format diagram of an Ethernet frame, which may carry an RTP packet.
Figure 2:
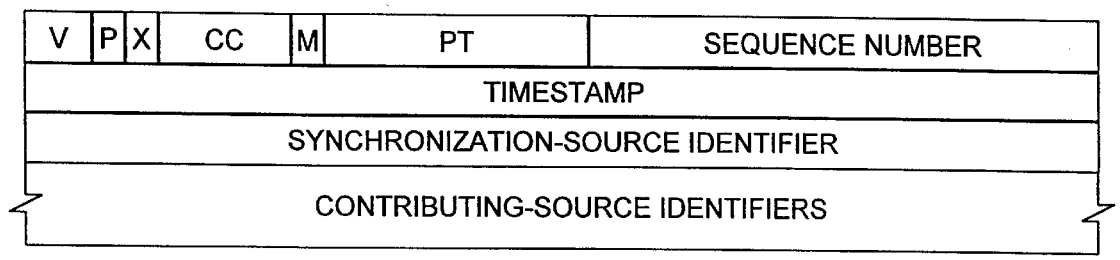
FIG. 2, previously discussed, is a format diagram of an RTP header.
Figure 3:
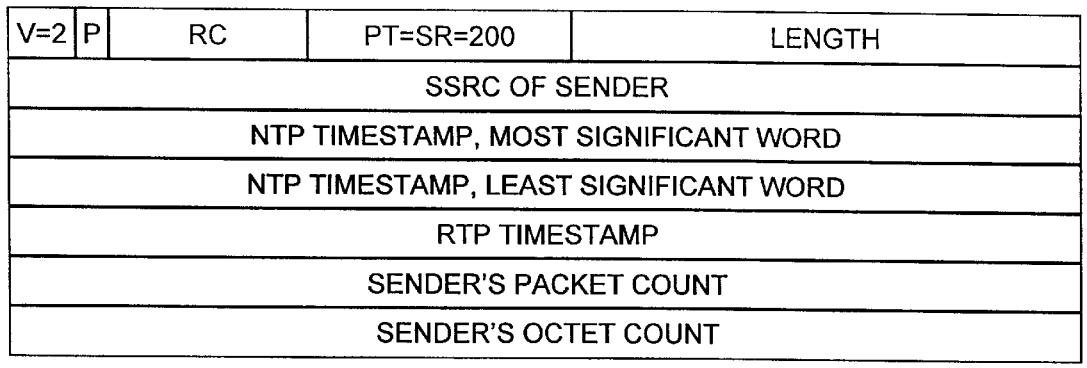
FIG. 3, previously discussed, is a format diagram of an RTCP sender-report packet's header and sender-information portions.
Figure 4:
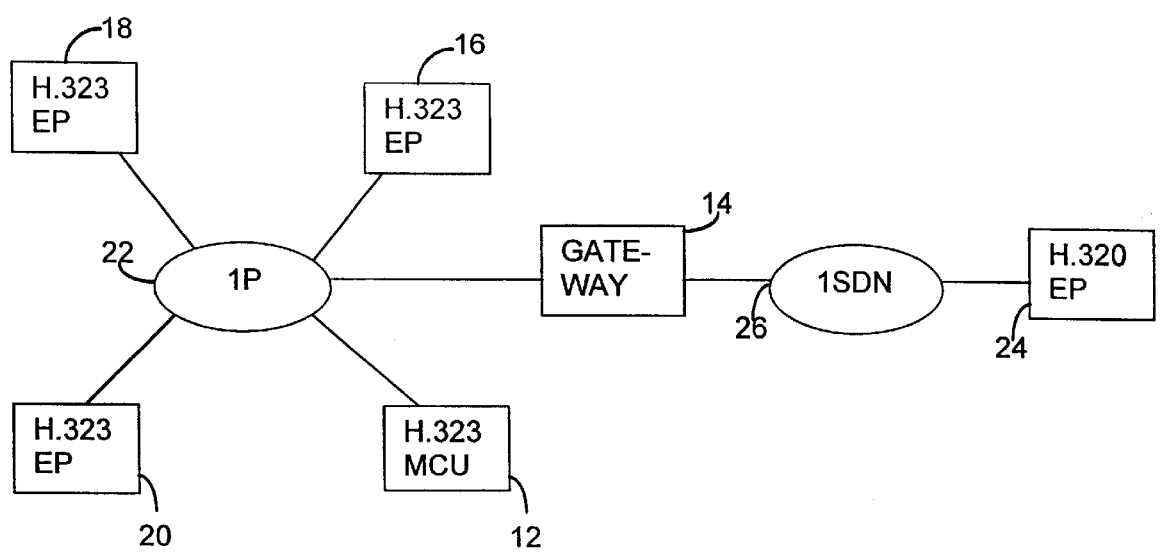
FIG. 4, previously discussed, is a topological diagram of a videoconference system.

To appreciate the way in which a network node may employ the present invention's teachings, consider FIG. 4's multipoint control unit 12. As was mentioned above, the way in which that unit would employ incoming timestamps is to base outgoing timestamps on their values. More specifically, it would determine the outgoing timestamps by "localizing" the times that the incoming timestamp values represent.

To understand what this means, consider a situation in which the multipoint control unit 12 receives samples from endpoint 16 and sends endpoint 18 data based on those received samples. In each packet of its session with the multipoint control unit 12, endpoint 16 places a timestamp whose value represents the relative time at which the first of that packet's samples was taken. In accordance with the RTP protocol, endpoint 16 conceptually starts a timestamp clock with an arbitrary value of, say, 1000, and increments this value as time progresses. And the multipoint control unit 12 starts its own local session clock for its session with endpoint 18. Let us assume that this clock starts three ticks later, with an initial value of 2003.

For the sake of explanation, we will initially assume that the multipoint control unit does nothing more than forward endpoint 18 the data it receives from endpoint 16. We will also assume initially that the timestamp applied by the multipoint control unit 12 to represent an outgoing packet's first sample is (atypically) to represent the time at which that first sample was taken at endpoint 16.

Since unit 12's session clock had a value of 2003 when node 16's had a value of 1003, node 12's clock has a value 1000 greater than node 16's for the same time. Under our assumption that multipoint control unit 12's timestamps are to represent the times at which endpoint 16 took the samples, therefore, the multipoint control unit 12 must add 1000 to node 16's timestamps to localize the sample times to its local session clock. This is a simple example of how a node can base its output on its input timestamps.

We now complicate this (over) simple example to make it more realistic. One complication deals with the fact that a receiving node ordinarily does not "know" the relationship between its wall clock and the transmitting node's. To describe the resultant complication, we first restate the above example's time relationships in terms of the multipoint control unit's local wall-clock time. The relationship between the incoming timestamp value $t_i$ and the local wall-clock time $T_s$ when a packet's first sample was apparently taken is:

$$T_s = t_i + \Delta_i, \tag{1}$$

where $\Delta_i$ is the quantity that expresses the current estimate of their relationship.

We can then think of above-described simplified timestamp localization as resulting from the following operation:

$$t_o = T_s - \Delta_o, \tag{2}$$

where $t_o$ is the outgoing-timestamp value and $\Delta_o$ is the (known) relationship between the local wall-lock time and the outgoing timestamps for the session in question. If this type of localization were to be performed in practice, of course, the timestamp value would more typically be calculated in accordance with $$t_o = t_i + \Delta_t, \tag{3}$$

where $\Delta_t \equiv \Delta_i - \Delta_o$.

As was mentioned above, though, one complication that the multipoint control unit must contend with is that it does not in general know the relationship $\Delta_i$ between its clock and the session clock of the node from which it receives the data.

True, the RTCP packets that it receives from that node give it the correspondence between the incoming timestamps and the sender's wall-clock time. But the sender's and receiver's wall-clock times are not in general synchronized with each other.

To deal with this problem, the illustrated embodiment assumes a relationship between received timestamps and its own wall-clock time that makes the shortest apparent packet transit time between node 16 and node 12 equal to zero. It adjusts this relationship dynamically, in a manner that will be described.

When the receiving node receives an RTP packet, it computes the apparent delay $T_a - T_s$, where $T_a$ is the packet's time of arrival. As will presently be apparent, a positive value of apparent delay means that some previous packet's travel time was less this one's. When the apparent delay is positive, the receiving node does not adjust the relationship value $\Delta_t$; it uses it in the localization process without change.

If the apparent delay is negative, though, the receiving node makes the following adjustment:

$$\Delta_t = T_a - t_i \quad (4)$$

so that the previously negative apparent delay becomes zero. This is the relationship value thereafter used in the localization process until another adjustment needs to be made.

Another complication arises from the fact that the outgoing timestamp is not typically intended to represent the source sampling time. The foregoing emphasis on sampling suggests the decoupling, to which RTP lends itself, of timestamp value from actual transmission time.

In practice, though, transmission ordinarily tracks sampling, occurring with a minor offset from the sampling time. Indeed, many endpoints will make this assumption and use the (admittedly unsynchronized) NTP timestamp as a basis on which to judge transmission delays. And observations suggest that many ignore NTP timestamps entirely, simply "playing" the audio and/or video as it arrives. So a re-transmitting node such as the multipoint control unit 12 will ordinarily attempt to make packets' times of transmissions correspond to the timestamps that it has respectively applied to them.

The forwarding node will therefore add to equation (3)'s computation of the output timestamp an offset that permits the packet to reach its transport mechanism's transmit queue at the time represented by the resultant timestamp. It is convenient in some applications for this additional offset to be considered the sum of two values, namely, a jitter delay $\Delta_j$ and a processing delay $\Delta_p$, which, when added to the right side of equation (3), yields:

$$t_o = t_i + \Delta_t + \Delta_j + \Delta_p. \quad (5)$$

The purpose for representing the offset as having two parts can be understood best by first considering what happens without either offset constituent. Let us make the simplifying assumption that the node can transmit the data with no delay after it receives it. Let us further assume that the node will attempt to have its transmission times track as closely as possible the times that the packets' timestamps represent. Since incoming packets times of arrival do not track their timestamps with the accuracy that the node is attempting to maintain on its output, this would represent a problem in the absence of the jitter delay $\Delta_j$.

To appreciate this, consider a first packet that arrives from the source with zero apparent delay and is followed by a packet whose delay is considerably greater. If the receiving node had re-transmitted the first packet's data immediately, with a timestamp reflecting the time of transmission, then it would not be able to transmit the next packet's data with a timestamp that both reflects the time of retransmission and so tracks the incoming timestamp as to maintain the correct relative timing. With the jitter delay $\Delta_j$, though, re-transmission of the early-received data is delayed by enough to avoid, this difficulty.

The other part of that offset, namely, the processing delay $\Delta_p$, represents the fact that the re-transmitting node actually cannot transmit data with no delay after receiving the data on which it is based. It also shows that the division of the offset into two parts has a practical aspect as well as a conceptual one, because $\Delta_p$ may be applied in different ways.

To appreciate this, consider the case of a multipoint control unit that is to re-transmit in respective RTP sessions (1) video from one source and (2) that source's audio mixed with other sources' audio. In the case of the audio data, the output timestamps' dependence on the incoming timestamps is somewhat indirect. To mix audio from separate sources, the multipoint control unit must first decode the incoming audio from the various sources, mix the resultant de, coded audio appropriately, and then re-encode it. After re-encoding, the resultant data have been mixed from various sources, so no particular incoming packet's timestamp may represent the resultant data's timing.

The re-transmitting node therefore determines the outgoing timestamp from the local wall-clock time at which the mixing process has been completed. To make the outgoing timestamp nonetheless depend on the incoming timestamp, the re-transmitting node times submission of the incoming data to its mixing process in accordance with the incoming timestamps (adjusted by jitter delay). To a good approximation, the resultant output timestamp is the quantity that equation (5) represents.

In contrast to audio processing, video processing imposes almost no delay in this scenario. Even in so-called continuous-presence arrangements, in which different sources' video is displayed in different quadrants of the same video outlet, the processing delay involved is largely negligible in comparison with the corresponding audio-processing delay. But the audio and video should remain aligned in time, so the $\Delta_p$ component, which results from actual processing in the audio case, results in the video case from a calculation, i.e., from adding a value equal to the delay that audio processing is known to cause.

Figure 5:
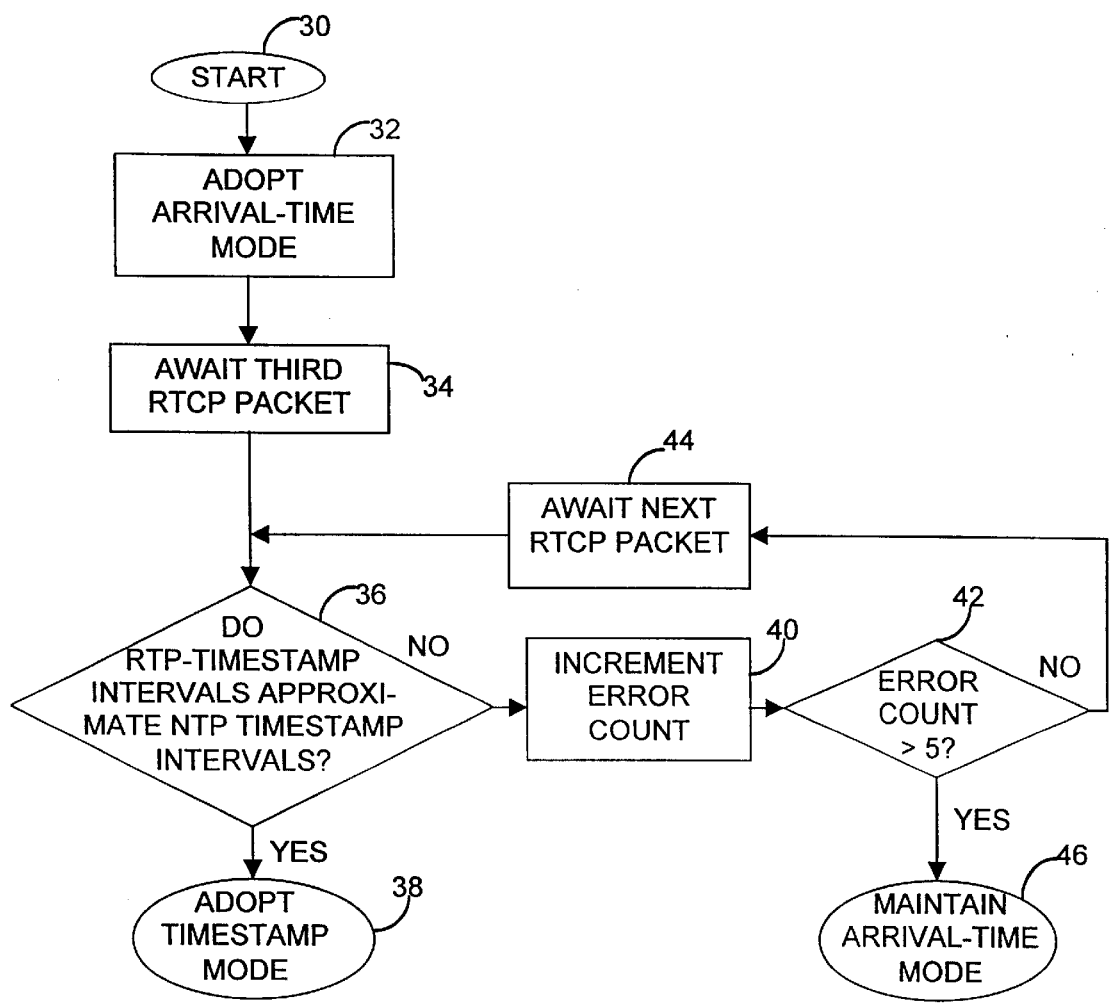
FIG. 5 is a block diagram of the method that the illustrated embodiment uses to determine whether to initiate timestamp-based output generation.

The discussion of output-timestamp determination has so far been based on the assumption that the re-transmitting node bases its output timestamps (or other output timing) on the incoming timestamps. According to the present invention, though, output timestamps are only selectively based on input timestamps. If the incoming packets do not pass tests designed to assess the incoming timestamps' reliability, then the re-transmitting node does not use them. FIG. 5 illustrates the approach.

FIG. 5's block 30 represents the beginning of a session. When the session starts, the multipoint control unit does not initially assume that the incoming timestamps are valid: it bases its output timing on the incoming packets' times of arrival, as block 32 indicates. The ways of determining output-timestamp values in this time-of-arrival mode are the same as those described above for the timestamp mode, with the exception that the packets' times of arrival are used instead of their timestamps.

Now, those skilled in the art will recognize that packet networks do not always deliver packets in order. So some implementations of the present invention may therefore use as "times of arrival" values that result from so adjusting the actual times of arrival values as to maintain the sequence that the RTP packets' sequence numbers represent. But such an adjustment will not be found necessary in most implementations, because the delivery mechanism most frequently employed to deliver RTP packets is UDP, which, not being a reliable transport mechanism, rarely delivers packets out of order.

Experience has shown that initial timestamps are often improper even when they come from sources whose timestamps are otherwise correct. The illustrated embodiment therefore waits until it has received the third sender-report message from that source, as block 34 indicates, before it decides whether to base its output on the incoming timestamps. Many types of tests can be used to determine whether to adopt the timestamp mode, but each one's purpose is to assess the incoming timestamps' reliability. In the illustrative embodiment, the receiving node determines in some fashion whether the advance in RTP timestamp since the last RTCP packet is approximately the same as the advance in NTP timestamps.

For instance, the receiving node could compare the current packet's offset between its NTP and RTP timestamps with the offset in the previous packet. Or it could compare the difference between the two packets' RTP timestamps with the difference between their NTP timestamps. In any event, if the difference is relatively small, say, less than 250 milliseconds, then the receiving node adopts the timestamp mode for applying its own timestamps, as blocks 36 and 38 indicate.

As block 40 indicates, the receiving node otherwise increments an error count that begins at zero. If the resultant count does not exceed five, the node awaits receipt of the next RTCP packet, as blocks 42 and 44 indicate. When it receives the next RTCP packet, it again compares the RTP-timestamp advance with the NTP-timestamp advance, as block 36 indicates. If the comparison continues to result in too great a deviation, the error count eventually exceeds five, and the node concludes that it should maintain the arrival-time mode throughout the session, as block 46 indicates.

Once the time-of-arrival mode has been assumed as a result of the incoming packets' failure to pass the timestamp-reliability test, that mode is maintained until the end of the session in the embodiment about to be illustrated. But this is not a requirement for all of the present invention's embodiments. In some implementations it may be considered beneficial to repeat that test from time to time to determine whether the received timestamps have now become reliable and to assume the timestamp mode if it has.

Some embodiments may remain in the timestamp mode throughout a session once they have assumed it. In the illustrated embodiment, though, timestamp-reliability tests continue to be performed while the node is operating in the timestamp mode. If such tests conclude that the timestamps have become unreliable, then the node reverts to the time-of-arrival mode.

Figure 6:
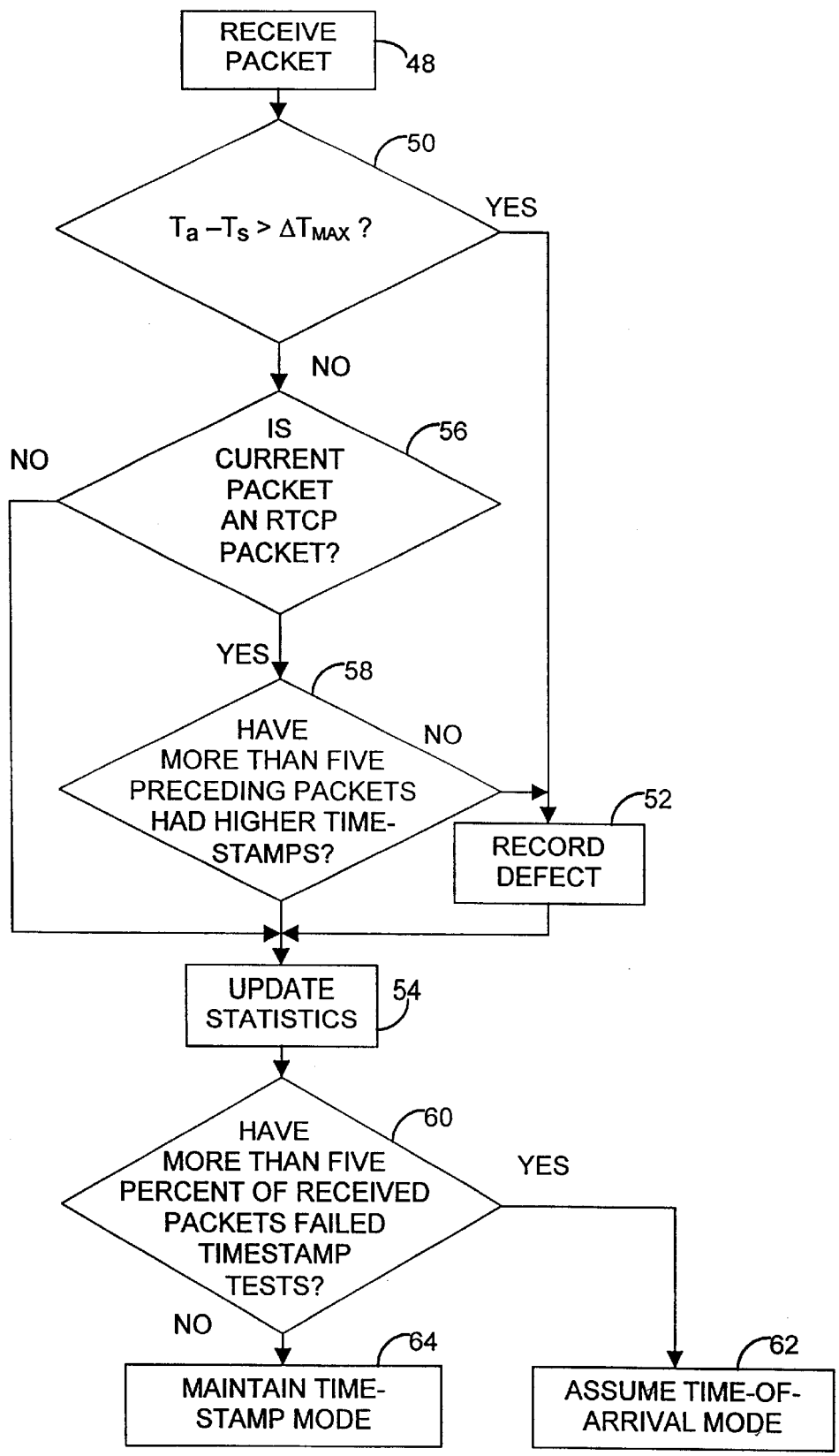
FIG. 6 is a block diagram of the method that the illustrated embodiment uses to determine whether to return to time-of-arrival output-timing determination.

These continued timestamp-reliability tests may be the same as those on which the initial determination to commence timestamp-mode operation was based. As FIG. 6 illustrates, though, the illustrated embodiment employs different criteria during timestamp-mode operation. That drawing's block 48 represents receipt of an RTP or RTCP packet. When the receiving node receives the packet, it determines whether the apparent delay exceeds a predetermined maximum $\Delta T_{MAX}$. Too great an apparent delay suggests that something may be wrong with the incoming packet's timestamp. If the packet fails this test, which block 50 represents, the receiving node could simply conclude that the timestamps are no longer valid and immediately revert to the time-of-arrival mode. As blocks 52 and 54 illustrate, though, the illustrated embodiment merely records the fact that the packet may have had an unreliable timestamp.

As blocks 56 and 58 indicate, packets that pass the excessive-delay test of block 50 are subjected to a further test if they are RTCP packets. The test that block 58 represents is an indication of whether the timestamps in the incoming RTP packets are consistent with those of the incoming RTCP packets. If more than, say, five preceding RTP packets have times tamps indicating a later time, the receiving node records this as a defect.

As was mentioned above in connection with block 54, statistics are thereafter recorded. This step's purpose is to enable the system to determine how frequently defects have occurred. FIG. 6's block 60 represents the test as being whether more than five percent of received packets have failed the test of block 50 or 58. (Again, other embodiments may employ different tests.) This determination can be based on stored data for a suitable-sized window of most-recent packets. Or an exponential average could be used to base it on the entire session.

As block 62 indicates, the result of this test is to convert to the time-of-arrival mode if too many packets fail the test. If the failure rate is acceptable, on the other hand, the node keeps operating in the time-stamp mode, as block 64 indicates.

In the bulk of the preceding discussion, the receiving node's output timing was assumed to be represented by timestamps in output packets. As was mentioned above, though, the present invention's teachings can be applied to other types of outputs. In particular, an endpoint may use this approach to determine the timing with which it presents the received data on a screen and speakers. Similarly, a gateway may use this approach to determine the timing with which it transmits data into a circuit-switched channel.

In any event, the resultant system can provide high-quality output in a wide range of operating environments. Proper use of properly timestamped inputs lends itself to high-quality rendition of the transmitted data. The present invention enables the receiving system to take advantage of this fact while minimizing the performance degradation that can result from using timestamps that have not been generated properly. It therefore constitutes a significant advance in the art.

What is claimed is:

1. A method of generating an output from data received in an RTP session comprising:
   A) receiving RTP and RTCP packets associated with the session;
   B) timing the output in accordance with the times of arrival of the packets that contain the data from which the output is generated;
   (C) while the output is being thus time determining whether the RTP timestamps carried by the packets satisfy a first timestamp-validation criterion; and
   (D) if the RTP timestamps are thereby determined to satisfy the first timestamp-validation criterion, changing to timing the output in accordance with the received timestamp values.

2. A method as defined in claim 1 wherein the first timestamp-validation criterion includes the requirement that, for at least a predetermined fraction of the received packets, the apparent packet transit time not exceed the least previous apparent packet transit time by more than a delay threshold.

3. A method as defined in claim 1 wherein the first timestamp-validation criterion includes the requirement that, for at least a predetermined fraction of the received packets, a received RTCP packet bearing an RTP timestamp not have been received after more than a maximum number of RTP data packets bearing later-value RTP timestamps.

4. A method as defined in claim 1 wherein the first timestamp-validation criterion includes the requirement that the variation in offset between RTP and corresponding NTP values carried by the RTCP packets be less than a predetermined maximum.

5. A method as defined in claim 1 further including:
A) determining whether the RTP timestamps carried by the packets satisfy a second timestamp-validation criterion;
B) if the RTP timestamps are thereby determined to satisfy the first timestamp-validation criterion, changing to timing the output in accordance with the times of arrival of the packets that contain the data from which the output is generated.

6. A method as defined in claim 5 wherein the second criterion differs from the first criterion.

7. A method as defined in claim 6 wherein the first criterion includes the requirement that the variation in offset between RTP and corresponding NTP values carried by the RTCP packets be less than a predetermined maximum.

8. A method as defined in claim 6 wherein the second criterion includes the requirement that, for at least a predetermined percentage of the received packets in an RTP session:
A) the apparent packet transit time not exceed the least previous apparent packet transit time by more than a delay threshold; and
B) if the packet is an RTCP packet, it not have been received after more than a maximum number of RTP data packets bearing later-value RTP timestamps.

9. A method as defined in claim 8 wherein the first criterion includes the requirement that the variation in offset between RTP and corresponding NTP values carried by the RTCP packets be less than a predetermined maximum.

10. A method as defined in claim 5 wherein the first criterion includes the requirement that the variation in offset between RTP and corresponding NTP values carried by the RTCP packets be less than a predetermined maximum.

11. A method as defined in claim 10 wherein, while the output at the beginning of an RTP session is timed in accordance with the times of arrival of the packets that contain the data from which the output is generated, the step of determining whether the RTP timestamps carried by the packets satisfy the timestamp-validation criterion is performed only after a predetermined number of RTCP packets have been received.

12. A method as defined in claim 5 wherein the second criterion includes the requirement that, for at least a predetermined percentage of the received packets in an RTP session:
A) the apparent packet transit time not exceed the least previous apparent packet transit time by more than a delay threshold; and
B) if the packet Is an RTCP packet, it not have been received after more than a maximum number of RTP data packets bearing later-value RTP timestamps.

13. A network node configured as an RTP speaker that generates an output from data received in an RTP session and:
A) receives RTP and RTCP packets associated with the session;
B) times the output in accordance with the times of arrival of the packets that contain the data from which the output is generated;
C) while the output is being thus timed, determines whether the RTP timestamps carried by the packets satisfy a timestamp-validation criterion; and
D) if the RTP timestamps are thereby determined to satisfy the so first timestamp-validation criterion, changes to timing the output in accordance with the received timestamp values.

14. A network node as defined in claim 13 wherein the first timestamp-validation criterion includes the requirement that, for at least a predetermined fraction of the received packets, the apparent packet transit time not exceed the least previous apparent packet transit time by more than a delay threshold.

15. A network node as defined in claim 13 wherein the first timestamp-validation criterion includes the requirement that, for at least a predetermined fraction of the received packets, a received RTCP packet bearing an RTP timestamp not have been received after more than a maximum number of RTP data packets bearing later-value RTP timestamps.

16. A network node as defined in claim 13 wherein the first timestamp-validation criterion includes the requirement that the variation in offset between RTP and corresponding NTP values carried by the RTCP packets be less than a predetermined maximum.

17. A network node as defined in claim 13 wherein the network node further:
A) makes a determination of whether the RTP timestamps carried by the packets satisfy a second timestamp-validation criterion; and
B) if the RTP timestamps are thereby determined to satisfy the first timestamp-validation criterion, changes to timing the output in accordance with the times of arrival of the packets that contain the data from which the output is generated.

18. A network node as defined in claim 17 wherein the second criterion differs from the first criterion.

19. A network node as defined in claim 18 wherein the first criterion includes the requirement that the variation in offset between RTP and corresponding NTP values carried by the RTCP packets be less than a predetermined maximum.

20. A network node as defined in claim 18 wherein the second criterion includes the requirement that, for at least a predetermined percentage of the received packets in an RTP session:
A) the apparent packet transit time not exceed the least previous apparent packet transit time by more than a delay threshold; and
B) if the packet is an RTCP packet, it not have been received after more than a maximum number of RTP data packets bearing later-value RTP timestamps.

21. A network node as defined in claim 20 wherein the first criterion includes the requirement that the variation in offset between RTP and corresponding NTP values carried by the RTCP packets be less than a predetermined maximum.

22. A network node as defined in claim 17 wherein the first criterion includes the requirement that the variation in offset between RTP and corresponding NTP values carried by the RTCP packets be less than a predetermined maximum.

23. A network node as defined in claim 22 wherein, while the output at the beginning of an RTP session is timed in accordance with the times of arrival of the packets that contain the data from which the output is generated, the determination is made of whether the RTP timestamps carried by the packets satisfy the first timestamp-validation criterion only after a predetermined number of RTCP packets have been received.

24. A network node as defined in claim 17 wherein the second criterion includes the requirement that, for at least a predetermined percentage of the received packets in an RTP session:

A) the apparent packet transit time not exceed the least previous apparent packet transit time by more than a delay threshold; and B) if the packet is an RTCP packet, it not have been received after more than a maximum number of RTP data packets bearing later-value RTP timestamps.

\* \* \* \* \*